United States Patent
Park et al.

(10) Patent No.: US 11,262,748 B2
(45) Date of Patent: Mar. 1, 2022

(54) ELECTRONIC DEVICE FOR CONTROLLING UNMANNED AERIAL VEHICLE AND CONTROL METHOD THEREFOR

(71) Applicant: Samsung Electronics Co., Ltd., Gyeonggi-do (KR)

(72) Inventors: Chan-Woo Park, Gyeonggi-do (KR); Sung-Jun Kim, Gyeonggi-do (KR); Ju-Yeoung Kim, Gyeonggi-do (KR); Bo-Ram Namgoong, Gyeonggi-do (KR); Ji-Hyun Park, Gyeonggi-do (KR); Jung-Ho Ahn, Seoul (KR); Euy-Beom Lee, Gyeonggi-do (KR); Man-Su Han, Gyeonggi-do (KR); Kyung-Hee Lee, Seoul (KR); Ju-Yeong Lee, Seoul (KR)

(73) Assignee: Samasung Electronics Co., Ltd., Suwon-si (KR)

( * ) Notice: Subject to any disclaimer, the term of this patent is extended or adjusted under 35 U.S.C. 154(b) by 227 days.

(21) Appl. No.: 16/467,595

(22) PCT Filed: Dec. 8, 2017

(86) PCT No.: PCT/KR2017/014401
§ 371 (c)(1),
(2) Date: Jun. 7, 2019

(87) PCT Pub. No.: WO2018/106064
PCT Pub. Date: Jun. 14, 2018

(65) Prior Publication Data
US 2020/0033852 A1    Jan. 30, 2020

(30) Foreign Application Priority Data
Dec. 8, 2016 (KR) .................. 10-2016-0166996

(51) Int. Cl.
*G05D 1/00* (2006.01)
*B64C 39/02* (2006.01)

(52) U.S. Cl.
CPC ......... *G05D 1/0038* (2013.01); *B64C 39/024* (2013.01); *G05D 1/0022* (2013.01);
(Continued)

(58) Field of Classification Search
CPC .. G05D 1/0038; G05D 1/0022; G05D 1/0088; B64C 39/024
See application file for complete search history.

(56) References Cited

U.S. PATENT DOCUMENTS 6,434,085 B1 *  8/2002  Nedwell ............. G01S 15/06
                                                            367/100
7,440,826 B2 * 10/2008  Franceschini ....... G05D 1/0646
                                                            244/17.13
(Continued)

FOREIGN PATENT DOCUMENTS

JP       2009-279368 A      12/2009
KR   10-2013-0002492 A       1/2013
(Continued)

*Primary Examiner* — Peter D Nolan
*Assistant Examiner* — Mikko Okechukwu Obioha
(74) *Attorney, Agent, or Firm* — Cha & Reiter, LLC

(57) ABSTRACT

The present invention relates to an electronic device for controlling an unmanned aerial vehicle and a control method therefor. The electronic device for controlling an unmanned aerial vehicle according to the present invention comprises: a first sensor for sensing a first direction; a second sensor for sensing a second direction opposite to the first direction; and a processor electrically connected to the first sensor and the second sensor, wherein the processor may be configured to: determine whether the unmanned aerial vehicle is located in a first environment on the basis of at least one sensing data obtained by the first sensor; control sensing operations of the first sensor and the second sensor according to the determi- (Continued)

nation result; and control motion of the unmanned aerial vehicle on the basis of at least one sensing data obtained by the first sensor and the second sensor.

14 Claims, 11 Drawing Sheets

(52) U.S. Cl.
CPC ...... *G05D 1/0088* (2013.01); *B64C 2201/127* (2013.01); *B64C 2201/141* (2013.01); *B64C 2201/146* (2013.01)

(56) References Cited

U.S. PATENT DOCUMENTS

| | | | | |
|---|---|---|---|---|
| 8,577,520 | B1* | 11/2013 | Wong | A63H 27/12 701/4 |
| 8,639,400 | B1* | 1/2014 | Wong | A63H 27/12 701/4 |
| 9,855,512 | B1* | 1/2018 | Wong | G05D 1/0858 |
| 10,946,958 | B2* | 3/2021 | Baek | B64C 27/006 |
| 2012/0173053 | A1* | 7/2012 | Ohtomo | G01C 11/04 701/4 |
| 2013/0325217 | A1 | 12/2013 | Seydoux et al. | |
| 2014/0008496 | A1* | 1/2014 | Ye | B64C 13/20 244/190 |
| 2015/0373322 | A1* | 12/2015 | Goma | G01S 17/894 348/21 |
| 2017/0068251 | A1* | 3/2017 | Zhang | G05D 1/042 |
| 2018/0017973 | A1* | 1/2018 | Teague | G08G 5/0069 |
| 2018/0032040 | A1* | 2/2018 | Sweet, III | G05B 15/02 |
| 2018/0068570 | A1* | 3/2018 | Gupta | B64C 39/024 |
| 2019/0101935 | A1* | 4/2019 | Lai | B64C 39/024 |
| 2019/0172358 | A1* | 6/2019 | Zhou | G08G 5/006 |
| 2019/0253611 | A1* | 8/2019 | Wang | H04N 5/23299 |

FOREIGN PATENT DOCUMENTS

| | | |
|---|---|---|
| KR | 10-2013-0037697 A | 4/2013 |
| KR | 10-1286376 B1 | 7/2013 |
| KR | 10-1585650 B1 | 1/2016 |
| KR | 10-2016-0083774 A | 7/2016 |

* cited by examiner

ELECTRONIC DEVICE FOR CONTROLLING UNMANNED AERIAL VEHICLE AND CONTROL METHOD THEREFOR

CROSS-REFERENCE TO RELATED APPLICATION(S)

This application is a National Phase Entry of PCT International Application No. PCT/KR2017/014401, which was filed on Dec. 8, 2017, and claims priority to Korean Patent Application No. 10-2016-0166996, which was filed on Dec. 8, 2016, the contents of which are incorporated herein by reference.

BACKGROUND

1. Field

Various embodiments of the present disclosure relate to an electronic device for controlling an unmanned aerial vehicle and a control method of the electronic device.

2. Description of the Related Art

Unmanned aerial vehicles can fly by the induction of radio waves without a human aboard, fly autonomously according to a previously input program, or fly by self-recognizing and self-determining a surrounding environment (an obstacle or a course). The unmanned aerial vehicle may include various sensors, e.g., a gyro sensor, a geomagnetic sensor, an acceleration sensor, a pressure sensor, an optical sensor, an image sensor, etc., and may be used for military purposes such as surveillance, reconnaissance, precision weapon guidance, and communication/information relay, and the use thereof is expanding to civilian applications, such as disaster and accident prevention, monitoring of geographical and environmental changes, research and development, photographing, distribution, communication, etc. Further, with the commercialization of multi-copter-shaped miniaturized unmanned aerial vehicles including a plurality of rotors or propellers, unmanned aerial vehicles have been used for diverse applications.

SUMMARY

As unmanned aerial vehicles are used for diverse applications, the use of unmanned aerial vehicles in an indoor environment is sharply increasing. Unlike an outdoor environment, the indoor environment is affected less by wind, but it is not possible for unmanned aerial vehicles to effectively use the global positioning system (GPS). Since there are many objects that act as obstacles indoors various methods for controlling autonomous flight or stable hovering flight have been emerging for flight management at a limited altitude. Unfortunately in the indoor environment, unlike the outdoors, an obstacle on the ceiling as well as on the floor may be included in a sensing range of a sensor, and in this case, a difficulty may occur in controlling an unmanned aerial vehicle. For example, when the unmanned aerial vehicle approaches the ceiling, a low pressure is generated between the unmanned aerial vehicle and the ceiling, such that the unmanned aerial vehicle may be drawn into the ceiling, thus colliding with the ceiling.

The present disclosure has been made to solve the foregoing and other problems, and various embodiments of the present disclosure provide an electronic device for controlling an unmanned aerial vehicle that additionally includes a sensor for sensing a distance or an amount of change of movement on a top portion of the unmanned aerial vehicle, such that the electronic device may control autonomous flight or stable hovering flight in an indoor environment by using the top sensor of the unmanned aerial vehicle, and a control method of the electronic device.

According to various embodiments of the present disclosure, an electronic device for controlling an unmanned aerial vehicle (UAV) includes a first sensor configured to sense a first direction, a second sensor configured to sense a second direction that is opposite to the first direction, and a processor electrically connected to the first sensor and the second sensor, in which the processor is configured to determine based on at least one piece of sensing data obtained by the first sensor whether the UAV is located in a first environment, control sensing operations of the first sensor and the second sensor based on a result of the determination, and control movement of the UAV based on at least one sensing data obtained by the first sensor and the second sensor.

According to various embodiments of the present disclosure, an electronic device for controlling movement of an UAV includes a communication module configured to connect communication with the UAV, a display configured to display a user interface for controlling the UAV, the UAV including a first sensor configured to sense a first direction and a second sensor configured to sense a second direction opposite to the first direction, and a processor electrically connected to the communication module and the display, in which the processor is configured to receive from the UAV, information regarding whether the UAV is located in a first environment at least based on at least one sensing data obtained by the first sensor, change the user interface according to the received information, generate a control signal for controlling movement of the UAV based on an input made through the user interface, and transmit the generated control signal to the UAV.

According to various embodiments of the present disclosure, a control method of an electronic device for controlling a UAV includes obtaining sensing data through a first sensor configured to sense a first direction, obtaining sensing data through a second sensor configured to sense a second direction that is opposite to the first direction, determining whether the UAV is located in a first environment, based on at least one sensing data obtained by the first sensor, controlling sensing operations of the first sensor and the second sensor, based on a result of the determination, and controlling movement of the UAV, based on at least one sensing data obtained by the first sensor and the second sensor.

According to various embodiments of the present disclosure, by providing an electronic device for controlling an unmanned aerial vehicle (UAV) and a control method of the electronic device, autonomous flight or stable hovering flight in an indoor environment may be controlled using an upper sensor additionally provided on a top portion of the UAV.

DETAILED DESCRIPTION

Figure 1:
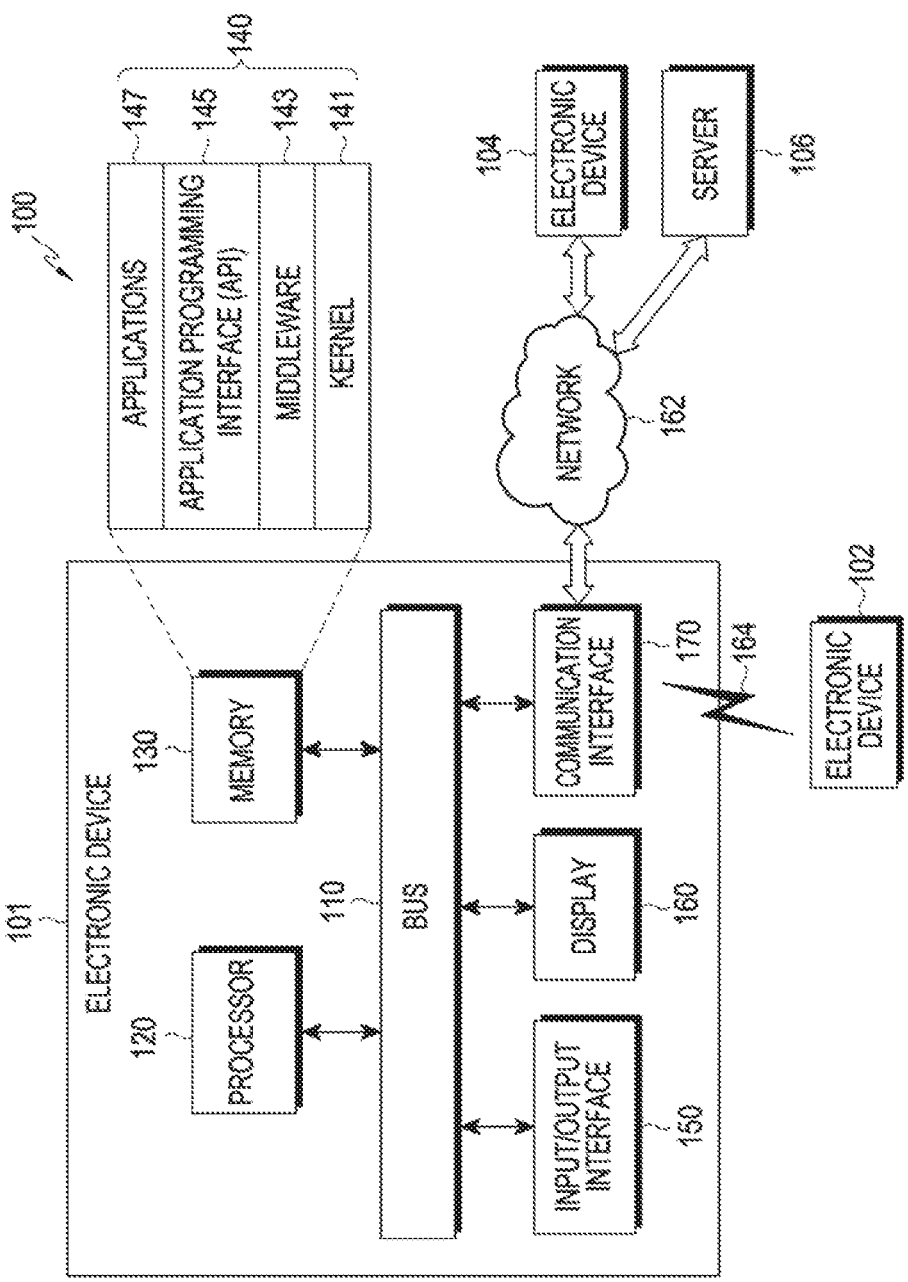
FIG. 1 is a block diagram of an electronic device in a network environment according to various embodiments of the present disclosure.

Hereinafter, various embodiments of the present disclosure will be disclosed with reference to the accompanying drawings. However, embodiments and terms used therein are not intended to limit the present disclosure to particular embodiments, and it should be construed as including various modifications, equivalents, and/or alternatives according to the embodiments of the present disclosure. With regard to the description of the drawings, similar reference numerals may be used to refer to similar or related elements. It is to be understood that a singular form of a noun corresponding to an item may include one or more of the things, unless the relevant context clearly indicates otherwise. In the present disclosure, an expression such as "A or B," or "at least one of A and/or B," may include all possible combinations of together listed items. Expressions such as "first," "second," "primarily," or "secondary," used herein may represent various elements regardless of order and/or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

An expression "configured to (or set)" used in the present disclosure may be replaced with, for example, "suitable for," "having the capacity to," "adapted to," "made to," "capable of," or "designed to" according to a situation. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory device.

Examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments, the electronic device may include, for example, a television (TV), a digital video disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, and an electronic frame.

In other embodiments, the electronic device may include at least one of various medical equipment (for example, magnetic resonance angiography (MRA), magnetic resonance imaging (MRI), computed tomography (CT), an imaging device, or an ultrasonic device), a navigation system, a global positioning system (GPS) receiver, an event data recorder (EDR), a flight data recorder (FDR), a vehicle infotainment device, electronic equipment for ships (e.g., a navigation system and gyro compass for ships), avionics, a security device, a vehicle head unit, an industrial or home robot, a drone, an automatic teller's machine (ATM), a Point of Sale (POS), or Internet of things (e.g., electric bulbs, various sensors, electricity or gas meters, sprinkler devices, fire alarm devices, thermostats, streetlights, toasters, exercise machines, hot-water tanks, heaters, boilers, and so forth). According to some embodiments, the electronic device may include a part of a piece of furniture, building/structure or a part of a vehicle, an electronic board, an electronic signature receiving device, a projector, and various measuring instruments (e.g., a water, electricity, gas, electric wave measuring device, etc.). According to various embodiments, the electronic device may be flexible or may be a combination of two or more of the above-described various devices. According to an embodiment of the disclosure, the electronic devices are not limited to those described above. Herein, the term "user" used in various embodiments of the present disclosure may refer to a person who uses the electronic device or a device using the electronic device (e.g., an artificial intelligence electronic device).

Referring to FIG. 1, an electronic device 101 in a network environment 100 according to various embodiments of the present disclosure is disclosed. The electronic device 101 may include a bus 110, a processor 120, a memory 130, an input/output (I/O) interface 150, a display 160, and a communication interface 170. According to some embodiments, the electronic device 101 may omit at least one of the foregoing elements or may further include other elements. The bus 110 may include a circuit for connecting, e.g., the elements 110 to 170 and delivering communication (e.g., a control message or data) between the elements 110 to 170. The processor 120 may include one or more of a central processing unit (CPU), an application processor (AP), and a communication processor (CP). The processor 120 performs operations or data processing for control and/or communication of, for example, at least one other elements of the electronic device 101.

The memory 130 may include a volatile and/or nonvolatile memory. The memory 130 may store, for example, instructions or data associated with at least one other elements of the electronic device 101. According to an embodiment of the present disclosure, the memory 130 may store software and/or a program 140. The program 140 may include at least one of, for example, a kernel 141, middleware 143, an application programming interface (API) 145, and/or an application program (or "application") 147, or the like. At least some of the kernel 141, the middleware 143, and the API 145 may be referred to as an operating system (OS). The kernel 141 may control or manage, for example, system resources (e.g., the bus 110, the processor 120, the memory 130, etc.) used to execute operations or functions implemented in other programs (e.g., the middleware 143, the API 145, or the application program 147). The kernel 141 provides an interface through which the middleware 143, the API 145, or the application program 147 accesses separate components of the electronic device 101 to control or manage the system resources.

The middleware 143 may work as an intermediary for allowing, for example, the API 145 or the application program 147 to exchange data in communication with the kernel 141. In addition, the middleware 143 may process one or more task requests received from the application program 147 based on priorities. For example, the middleware 143 may give a priority for using a system resource (e.g., the bus 110, the processor 120, the memory 130, etc.) of the electronic device 101 to at least one of the application programs 147, and may process the one or more task requests. The API 145 is an interface used for the application 147 to control a function provided by the kernel 141 or the middleware 143, and may include, for example, at least one interface or function (e.g., an instruction) for file control, window control, image processing or character control. The I/O interface 150 may deliver, for example, an instruction or data input from a user or another external device to other component(s) of the electronic device 101, or output an instruction or data received from other component(s) of the electronic device 101 to a user or another external device.

The display 160 may include, for example, a liquid crystal display (LCD), a light emitting diode (LED) display, an organic light emitting diode (OLED) display, a microelectromechanical system (MEMS) display, or an electronic paper display. The display 160 may, for example, display various contents (e.g., a text, an image, a video, an icon, and/or a symbol, etc.) to users. The display 160 may include a touch screen and receive a touch, a gesture, proximity, or a hovering input, for example, by using an electronic pen or a part of a body of a user. The communication interface 170 establishes communication between the electronic device 101 and an external device (e.g., a first external electronic device 102, a second external electronic device 104, or a server 106). For example, the communication interface 170 may be connected to a network 162 through wireless communication or wired communication to communicate with an external device (e.g., the second external electronic device 104 or the server 106).

Wireless communication may include a cellular communication protocol using at least one of, for example, long-term evolution (LTE), LTE advance (LTE-A), code division multiple access (CDMA), wideband CDMA (WCDMA), universal mobile telecommunications system (UMTS), wireless broadband (WiBro), global system for mobile communications (GSM), or the like. According to an embodiment, the wireless communication may include at least one of Wireless Fidelity (WiFi), Bluetooth, Bluetooth Low Energy (BLE), Zigbee, near field communication (NFC), magnetic secure transmission (MST), radio frequency (RF), or a body area network (BAN). According to an embodiment, the wireless communication may include a global navigation satellite system (GNSS). The GNSS may include, for example, at least one of a global positioning system (GPS), a global navigation satellite system (Glonass), a Beidou navigation satellite system ("Beidou"), or Galileo, the European global satellite-based navigation system. Hereinbelow, "GPS" may be used interchangeably with "GNSS". The wired communication may include, for example, at least one of a universal serial bus (USB), a high definition multimedia interface (HDMI), a recommended standard (RS)-232, power line communication, a plain old telephone service (POTS), or the like. The network 162 may include a telecommunications network, for example, at least one of a computer network (e.g., a local area network (LAN) or a wide area network (WAN)), Internet, or a telephone network.

Each of the first external electronic device 102 and the second external electronic device 104 may be a device of the same type as or a different type than the electronic device 101. According to various embodiments of the present disclosure, some or all of operations performed by the electronic device 101 may be performed in another electronic device or a plurality of electronic devices (e.g., the electronic device 102 or 104, or the server 106). According to an embodiment of the present disclosure, when the electronic device 101 has to perform a function or a service automatically or at a request, the electronic device 101 may request another device (e.g., the electronic devices 102 or 104 or the server 106) to perform at least some functions associated with the function or the service instead of or in addition to executing the function or the service. The another electronic device (e.g., the electronic device 102 or 104 or the server 106) may execute the requested function or additional function and deliver the execution result to the electronic device 101. The electronic device 101 may then process or further process the received result to provide the requested function or service. To that end, a cloud computing, distributed computing, or client-server computing technology may be used, for example.

Figure 2:
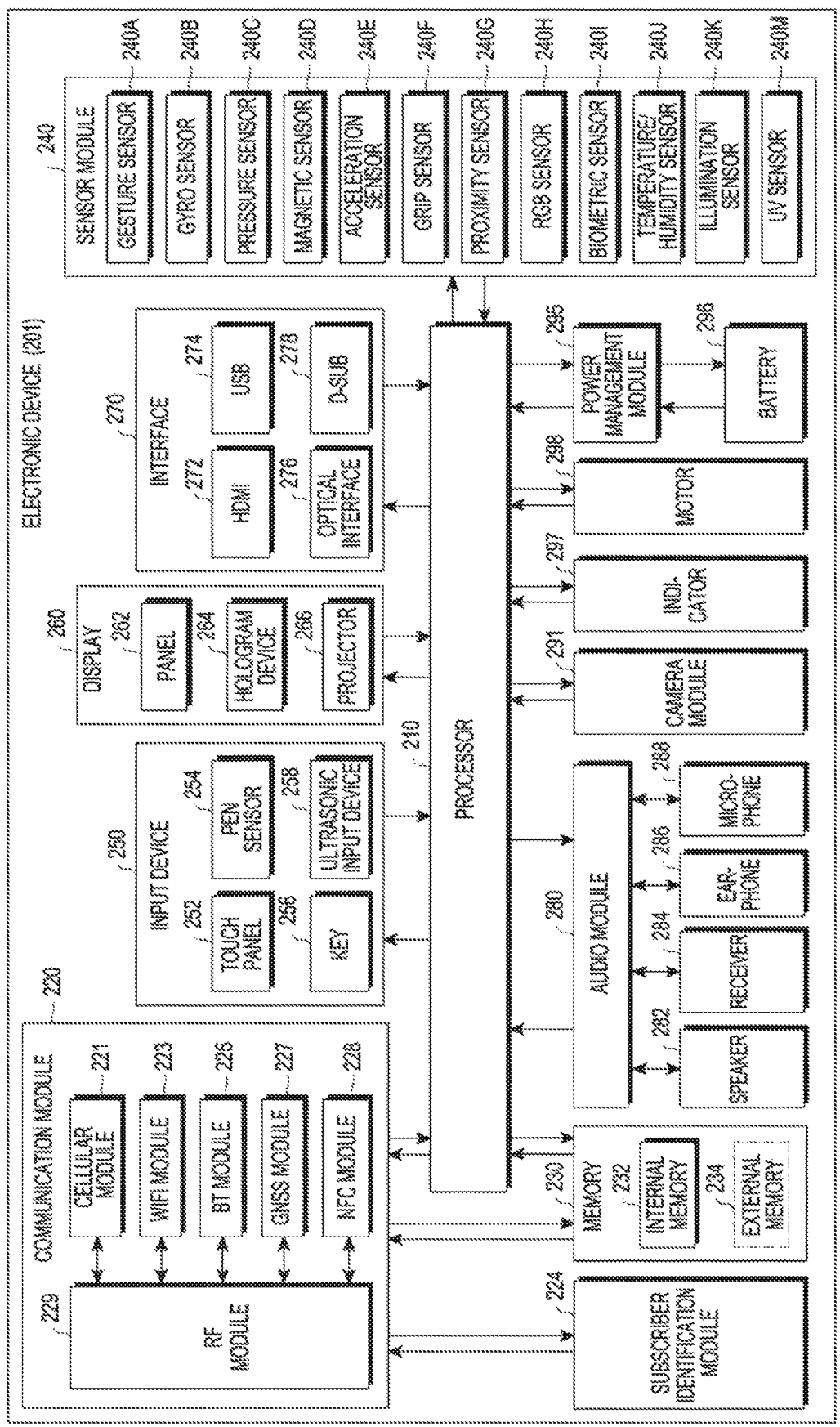
FIG. 2 is a block diagram of an electronic device according to various embodiments of the present disclosure.

FIG. 2 is a block diagram of an electronic device 201 according to various embodiments of the present disclosure. The electronic device 201 may form the entire electronic device 101 illustrated in FIG. 1 or a part of the electronic device 101 illustrated in FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 controls multiple hardware or software components connected to the processor 210 by driving an operating system (OS) or an application program, and performs processing and operations with respect to various data. The processor 210 may be implemented with, for example, a system on chip (SoC). According to an embodiment of the present disclosure, the server 210 may include a graphic processing unit (GPU) and/or an image signal processor. The processor 210 may include at least some of the elements illustrated in FIG. 2 (e.g., the cellular module 221). The processor 210 loads an instruction or data received from at least one of other elements (e.g., a non-volatile memory) into a volatile memory to process the instruction or data, and stores result data in the non-volatile memory.

The communication module 220 may have a configuration that is the same as or similar to the communication interface 170. The communication module 220 may include, for example, the cellular module 221, a WiFi module 223, a Bluetooth (BT) module 225, a GNSS module 227, an NFC module 228, and a radio frequency (RF) module 229. The cellular module 221 may provide, for example, a voice call, a video call, a text service, or an Internet service over a communication network. According to an embodiment, the cellular module 221 identifies and authenticates the electronic device 201 in a communication network by using the SIM 224 (e.g., a SIM card). According to an embodiment, the cellular module 221 may perform at least one of functions that may be provided by the processor 210. According to an embodiment, the cellular module 221 may include a communication processor (CP). According to some embodiment, at least some (e.g., two or more) of the cellular module 221, the WiFi module 223, the BT module 225, the GNSS module 227, and the NFC module 228 may be included in one integrated chip (IC) or IC package. The RF module 229 may, for example, transmit and receive a communication signal (e.g., an RF signal). The RF module 229 may include a transceiver, a power amplifier module (PAM), a frequency filter, a low noise amplifier (LNA), or an antenna. According to another embodiment, at least one of the cellular module 221, the WiFi module 223, the BT module 225, the GNSS module 227, or the NFC module 228 may transmit and receive an RF signal through the separate RF module. The SIM 224 may, for example, include a card including a SIM or an embedded SIM, and may include unique identification information (e.g., an integrated circuit card identifier (IC-CID) or subscriber information (e.g., an international mobile subscriber identity (IMSI)).

The memory 230 (e.g., the memory 130) may, for example, include an internal memory 232 and/or an external memory 234. The internal memory 232 may, for example, include at least one of a volatile memory (e.g., dynamic random access memory (DRAM), static RAM (SRAM), synchronous dynamic RAM (SDRAM), etc.), or a non-volatile memory (e.g., one time programmable read only memory (OTPROM), programmable ROM (PROM), erasable and programmable ROM (EPROM), electrically erasable and programmable ROM (EEPROM), mask ROM, flash ROM, a flash memory, and a solid state drive (SSD), etc.). The external memory 234 may further include flash drive, for example, compact flash (CF), secure digital (SD), micro-SD, mini-SD, extreme Digital (xD), a multi-media card (MMC), or a memory stick. The external memory 234 may be functionally or physically connected with the electronic device 201 through various interfaces.

The sensor module 240 measures physical quantity or senses an operation state of the electronic device 201 to convert the measured or sensed information into an electric signal. The sensor module 240 may, for example, include at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., red/green/blue (RGB) sensor), a biometric sensor 240I, a temperature/humidity sensor 240J, an illumination sensor 240K, or a ultraviolet (UV) sensor 240M. Additionally or alternatively, the sensor module 240 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, and/or a fingerprint sensor. The sensor module 240 may further include a control circuit for controlling at least one sensor included therein. In some embodiment, the electronic device 201 may further include a processor configured to control the sensor module 240 as part of or separately from the processor 210, to control the sensor module 240 during a sleep state of the processor 210.

The input device 250 may include, for example, a touch panel 252, a (digital) pen sensor 254, a key 256, or an ultrasonic input device 258. The touch panel 252 may use at least one of a capacitive type, a resistive type, an IR type, or an ultrasonic type. The touch panel 252 may further include a control circuit. The touch panel 252 may further include a tactile layer to provide tactile reaction to the user. The (digital) pen sensor 254 may include a recognition sheet which is a part of the touch panel 252 or a separate recognition sheet. The key 256 may also include a physical button, an optical key, or a keypad. The ultrasonic input device 258 senses ultrasonic waves generated by an input means through a microphone (e.g., the microphone 288) and checks data corresponding to the sensed ultrasonic waves.

The display 260 (e.g., the display 160) may include a panel 262, a hologram device 264, a projector 266, and/or a control circuit for controlling them. The panel 262 may be implemented to be flexible, transparent, or wearable. The panel 262 may be configured with the touch panel 252 in one module. According to an embodiment, the panel 262 may include a pressure sensor (or a "force sensor", interchangeably used hereinafter) capable of measuring a strength of a pressure by a user's touch. The pressure sensor may be implemented integrally with the touch panel 252 or may be implemented as one or more sensors separate from the touch panel 252. The hologram device 264 may show a stereoscopic image in the air by using interference of light. The projector 266 may display an image onto a screen through projection of light. The screen may be positioned inside or outside the electronic device 201. The interface 270 may include an HDMI 272, a USB 274, an optical interface 276, or a D-subminiature (D-sub) 278. The interface 270 may be included in the communication interface 170 illustrated in FIG. 1. Additionally or alternatively, the interface 270 may include a mobile high-definition link (MHL) interface, an SD/multi-media card (MMC) interface, or an Infrared Data Association (IrDA) interface.

The audio module 280 may bi-directionally convert sound and an electric signal. At least one element of the audio module 280 may be included in the input/output interface 145 illustrated in FIG. 1. The audio module 280 may process sound information input or output through the speaker 282, the receiver 284, the earphone 286, or the microphone 288. The camera module 291 is, for example, a device capable of capturing a still image or a moving image, and according to an embodiment, may include one or more image sensors (e.g., a front sensor or a rear sensor), a lens, an image signal processor (ISP), or a flash (e.g., an LED, a xenon lamp, etc.). The power management module 295 manages power of the electronic device 201. According to an embodiment, the power management module 295 may include a power management integrated circuit (PMIC), a charger IC, or a battery fuel gauge. The PMIC may have a wired and/or wireless charging scheme. The wireless charging scheme may include a magnetic-resonance type, a magnetic induction type, and an electromagnetic type, and may further include an additional circuit for wireless charging, for example, a coil loop, a resonance circuit, or a rectifier. The battery gauge may measure the remaining capacity of the battery 296 or the voltage, current, or temperature of the battery 296 during charging. The battery 296 may include, for example, a rechargeable battery and/or a solar battery.

The indicator 297 displays a particular state, for example, a booting state, a message state, or a charging state, of the electronic device 201 or a part thereof (e.g., the processor 210). The motor 298 may convert an electric signal into mechanical vibration or generates vibration or a haptic effect. The electronic device 201 may include a device for supporting the mobile TV (e.g., a GPU) to process media data according to a standard such as digital multimedia broadcasting (DMB), digital video broadcasting (DVB), or mediaFlo™. Each of the foregoing elements described herein may be configured with one or more components, names of which may vary with a type of the electronic device. In various embodiments, some components of the electronic device (e.g., the electronic device 201) may be omitted or may further include other elements, and some of the components may be coupled to form one entity and identically perform functions of the components before being coupled.

Figure 3:
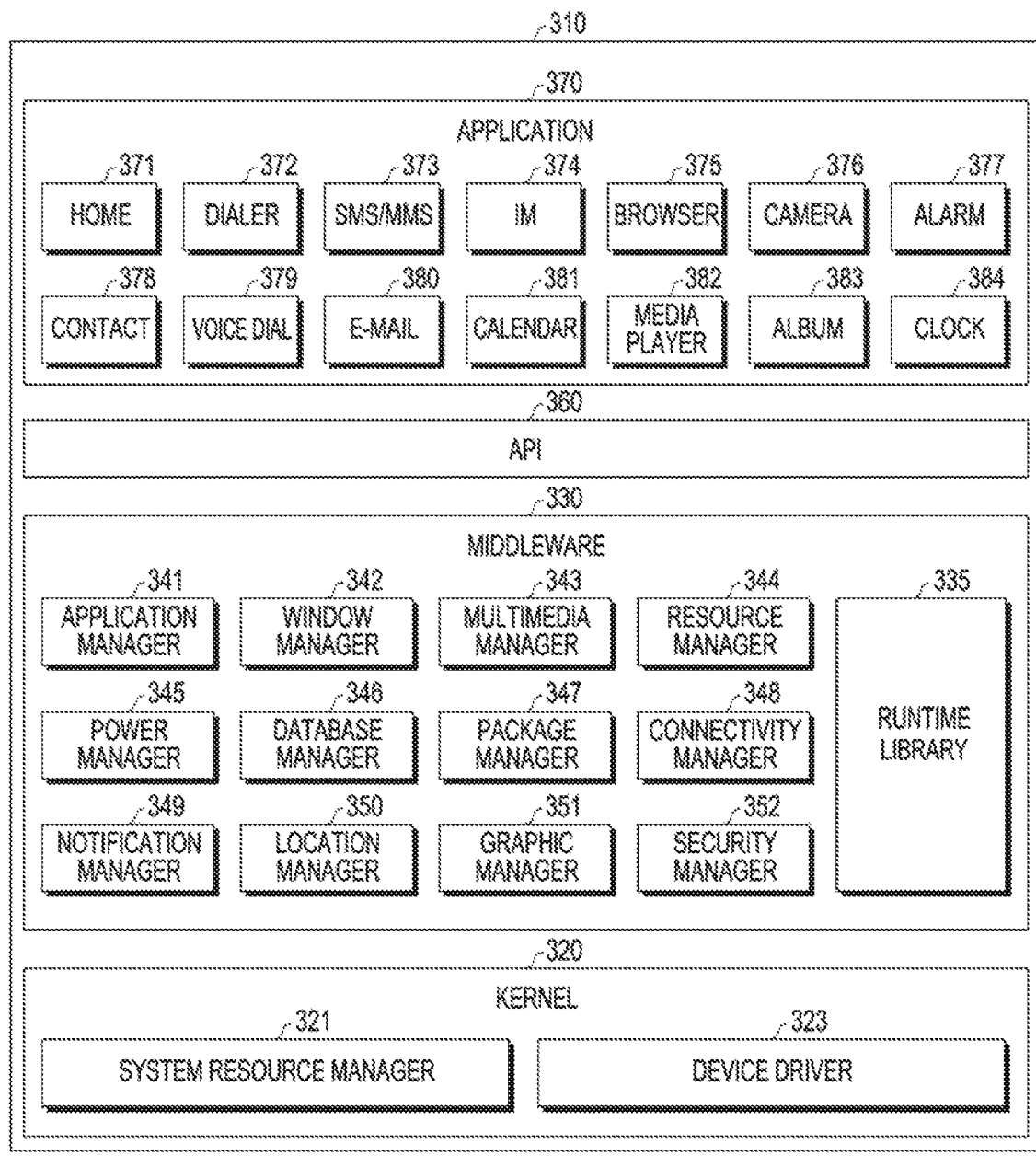
FIG. 3 is a block diagram of a programming module according to various embodiments of the present disclosure.

FIG. 3 is a block diagram of a programming module according to various embodiments. According to an embodiment, a programming module 310 (e.g., the program 140) may include an OS for controlling resources associated with an electronic device (e.g., the electronic device 101) and/or various applications (e.g., the application program 147) executed on the OS. The OS may include Android™, iOS™, Windows™, Symbian™, Tizen™, or Bada™. Referring to FIG. 3, the programming module 310 may include a kernel 320 (e.g., the kernel 141), middleware 330 (e.g., the middleware 143), an application programming interface (API) 360 (e.g., the API 145), and/or an application 370 (e.g., the application program 147). At least a part of the programming module 310 may be preloaded on an electronic device or may be downloaded from an external device (e.g., the electronic device 102 or 104, or the server 106).

The kernel 320 may include a system resource manager 321 and/or a device driver 323. The system resource manager 321 may perform control, allocation, retrieval of system resources, and so forth. According to an embodiment, the system resource manager 321 may include a process management unit, a memory management unit, or a file system management unit. The device driver 323 may include, for example, a display driver, a camera driver, a Bluetooth driver, a shared memory driver, a USB driver, a keypad driver, a WiFi driver, an audio driver, or an inter-process communication (IPC) driver. The middleware 330 may include provide functions that the application 370 commonly requires or provide various functions to the application 370 through the API 360 to allow the application 370 to use a limited system resource in an electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module that a compiler uses to add a new function through a programming language while the application 370 is executed. The runtime library 335 performs input/output management, memory management, or calculation function processing. The application manager 341 manages a life cycle of the applications 370. The window manager 342 manages a graphic user interface (GUI) resource used in a screen. The multimedia manager 343 recognizes a format necessary for playing media files and performs encoding or decoding on a media file by using a codec appropriate for a corresponding format. The resource manager 344 manages a source code or a memory space of the applications 370. The power manager 345 manages a battery or power and provides power information necessary for an operation of the electronic device. According to an embodiment, the power manager 345 may operate with basic input/output system (BIOS). The database manager 346 generates, searches or changes a database used for at least one application among the applications 370. The package manager 347 manages the installation or update of an application distributed in a package file format.

The connectivity manager 348 manages a wireless connection. The notification manager 349 provides an event, e.g., an arriving message, an appointment, proximity notification, etc. The location manager 350 manages location information of an electronic device. The graphic manager 351 manages, for example, a graphic effect to be provided to a user or a user interface (UI) relating thereto. The security manager 352 provides, for example, system security or user authentication. According to an embodiment, the middleware 330 may further include a telephony manager for managing a voice or video call function of the electronic device or a middleware module forming a combination of functions of the above-described components. According to an embodiment, the middleware 330 provides a module specified for each type of an OS. Additionally, the middleware 330 may delete some of existing elements or add new elements dynamically. The API 360 may be provided as a set of API programming functions with a different configuration according to the OS. In the case of Android or iOS, for example, one API set may be provided by each platform, and in the case of Tizen, two or more API sets may be provided.

The application 370 may include one or more applications capable of providing a function, for example, a home application 371, a dialer application 372, a short messaging service/multimedia messaging service (SMS/MMS) application 373, an instant message (IM) application 374, a browser application 375, a camera application 376, an alarm application 377, a contact application 378, a voice dial application 379, an e-mail application 380, a calendar application 381, a media player application 382, an album application 383, a clock application 384, a health care application (e.g., an application for measuring an exercise amount, a blood sugar, etc.), or an environment information providing application (e.g., an application for providing air pressure, humidity, or temperature information or the like). According to an embodiment, the application 370 may include an information exchange application supporting information exchange between the electronic device and an external electronic device. The information exchange application may include, for example, a notification relay application for transferring specific information to the external electronic device or a device management application for managing the external electronic device. For example, the notification relay application may deliver notification information generated in another application of the electronic device to an external electronic device or may receive notification information from the external electronic device and provide the notification information to the user. The device management application may manage (e.g., install, remove, or update) a function (e.g., turn on/turn off of an external electronic device itself (or a part thereof) or control of brightness (or resolution) of a display) of an external device communicating with the electronic device, a service provided by an application operating in an external electronic device or provided by the external electronic device (e.g., a call service or a message service). According to an embodiment, the application 370 may include an application (e.g., device health care application of mobile medical equipment) designated according to an attribute of the external electronic device. According to an embodiment, the application 370 may include an application received from the external electronic device. The at least a part of the programming module 310 may be implemented (e.g., executed) by software, firmware, hardware (e.g., the processor 210), or a combination of two or more of them, and may include, for example, modules, programs, routines, sets of instructions, or processes for performing one or more functions.

A term "module" used herein may mean, for example, a unit including one of or a combination of two or more of hardware, software, and firmware, and may be used interchangeably with terms such as logic, a logic block, a part, or a circuit. The "module" may be a part configured integrally, a minimum unit or a portion thereof performing one or more functions. The "module" may be implemented mechanically or electronically, and may include an application-specific integrated circuit (ASIC) chip, field-programmable gate arrays (FPGAs), and a programmable-logic device performing certain operations already known or to be developed. At least a part of an apparatus (e.g., modules or functions thereof) or a method (e.g., operations) according to various embodiments may be implemented with an instruction stored in a computer-readable storage medium (e.g., the memory 130) in the form of a programming module. When the instructions are executed by a processor (for example, the processor 120), the processor may perform functions corresponding to the instructions. The computer-readable recording medium includes hard disk, floppy disk, or magnetic media (e.g., a magnetic tape, optical media (e.g., compact disc read only memory (CD-ROM) or digital versatile disc (DVD), magneto-optical media (e.g., floptical disk), an embedded memory, and so forth. The instructions may include a code generated by a compiler or a code executable by an interpreter. Modules or programming modules according to various embodiments of the present disclosure may include one or more of the foregoing elements, have some of the foregoing elements omitted, or further include additional other elements. Operations performed by the module, the program, or another component according to various embodiments may be carried out sequentially, in parallel, repeatedly, or heuristically, or one or more of the operations may be executed in a different order or omitted, or one or more other operations may be added.

Hereinbelow, before describing an electronic device 401 that controls an unmanned aerial vehicle (UAV) according to various embodiments of the present disclosure, the UAV in the present disclosure will be described. The UAV refers to an aircraft, such as a quad-rotor, that is capable of vertically taking off and landing and is capable of making a movement, such as hovering, pitching, rolling, and yawing. However, the electronic device that controls the UAV according to the various embodiments of the present disclosure may be variously applicable, without being limited to the quad-rotor. For example, although a quad-rotor is illustrated as an example of the UAV in FIG. 4A, the UAV may be any UAV including one or more engines and/or one or more propellers. That is, the UAV may be any device that is capable of making a movement under control of the electronic device 401, without being limited thereto.

Meanwhile, the electronic device 401 according to various embodiments of the present disclosure is an electronic apparatus capable of controlling the UAV, which may be, for example, an electronic device integrally mounted on the UAV, a wearable electronic device mounted on the UAV to control respective functions of the UAV through electrical connection, or an electronic device connected by communication from the outside of the UAV to control respective functions of the UAV, without being limited thereto.

Figure 4A:
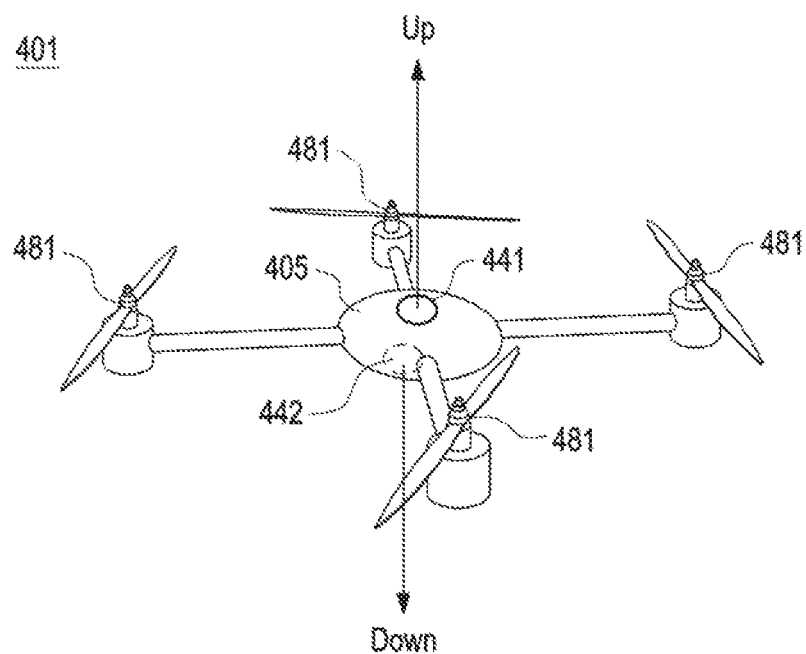
FIG. 4A is an external perspective view of an electronic device according to various embodiments of the present disclosure.
Figure 4B:
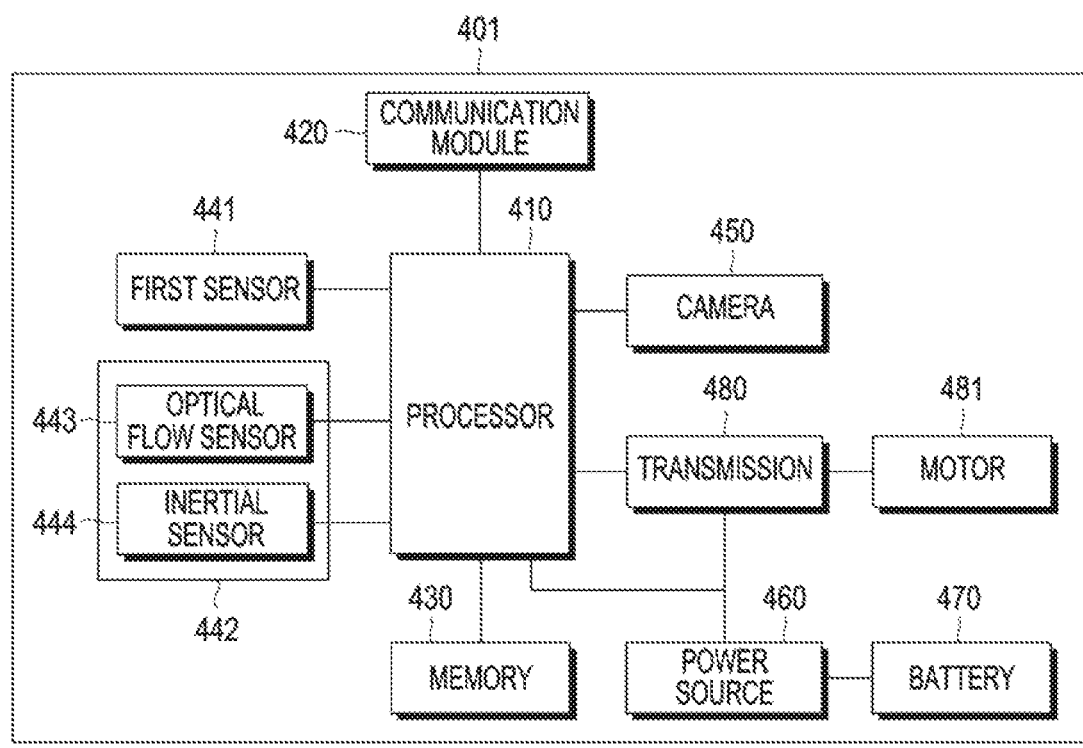
FIG. 4B is a block diagram of a structure of an electronic device according to various embodiments of the present disclosure.

FIG. 4A is an external perspective view of an electronic device according to various embodiments of the present disclosure, and FIG. 4B is a block diagram of a structure of an electronic device according to various embodiments of the present disclosure.

Referring to FIGS. 4A and 4B, the electronic device 401 according to various embodiments of the present disclosure is configured to control a UAV 405 in the form of a quad copter including four rotor-equipped motors 481 and capable of floating in the air by driving of the rotors, and the electronic device 401 may include a processor 410, a communication module 420, a memory 430, a first sensor 441, a second sensor 442 including an optical flow sensor 443 and an inertial sensor 444, a camera 450, a power source 460, a battery 470 that supplies power to the power source 460, a transmission 480, and the motor 481. The electronic device 401 may not necessarily include the memory 430, and although it is illustrated in FIG. 4B that the second sensor 442 includes only the optical flow sensor 443 and the inertial sensor 444, the second sensor 442 may be a single sensor or a combination of two or more sensors, and may include an ultrasonic sensor, an infrared sensor, a proximity sensor, an image sensor, and an optical flow sensor, etc., though not illustrated in FIG. 4B.

The UAV 405 may have the first sensor 441 mounted on a top portion thereof and the second sensor 442 mounted on a bottom portion thereof. The first sensor 441 may be mounted on the top portion of the UAV 405 to sense an upward direction (up) of the UAV 405. The second sensor 442 may be mounted on the bottom portion of the UAV 405 to sense a downward direction (down) of the UAV 405.

According to various embodiments of the present disclosure, the first sensor 441 and the second sensor 442 may sense whether an obstacle (e.g., a floor, a ceiling, etc.) is located in an oriented direction. The first sensor 441 and the second sensor 442 may sense a distance from an external object or sense the amount of change in movement of the UAV 405 with respect to a particular point of the external object. According to various embodiments of the present disclosure, the first sensor 441 and the second sensor 442 may include an ultrasonic sensor, an infrared sensor, a proximity sensor, an image sensor, and an optical flow sensor, etc. For example, the optical flow sensor may sense the amount of change in movement of the UAV 405 by using a brightness change of each pixel in an image of the external object located in the oriented direction when the UAV 405 moves. The first sensor 441 may be a single sensor or a combination of two or more sensors.

The sensor module 440 may process sensing data obtained by the first sensor 441 and the second sensor 442. The sensor module 440 may include a gyro sensor, a geomagnetic sensor, an acceleration sensor, a pressure sensor, etc., needed to control movement, e.g., autonomous flight, hovering flight, control signal-based flight, etc., of the UAV 405, in addition to the first sensor 441 and the second sensor 442.

The communication module 420 may perform data communication by connecting communication with an external electronic device. The communication module 420 may communicate with the external electronic device through wireless communication such as WiFi, BT, NFC, GNSS, or cellular communication (e.g., LTE, LTE-A, CDMA, WCDMA, UMTS, WiBro, GSM, etc.). The communication module 420 may support wired communication including at least one of USB, HDMI, universal asynchronous receiver transmitter (UART), RS-232, or POTS.

According to various embodiments of the present disclosure, the communication module 420 may receive a control signal for controlling movement of the UAV 405 from the external electronic device. The communication module 420 may transmit information related to control of movement of the UAV 405 to the external electronic device. The communication module 420 may transmit feedback information regarding the control signal received from the external electronic device to the external electronic device. The communication module 420 may receive a command signal for executing a function (e.g., image capturing, selfie capturing, etc.) included in the UAV 405 from the external electronic device.

The memory 430 may have stored therein a program for processing and controlling of the processor 410, and may execute a function for storing input/output data.

The camera module 450 may capture a still image or a moving image, and may include, for example, one or more image sensors, a lens, an image signal processor (ISP), a flash (e.g., an LED or a xenon lamp), etc.

The power source 460 may supply power needed for driving of an element included in the electronic device 401, and may include, for example, the battery 470. The power source 460 may include a charging control circuit capable of supplying power provided from the outside to the battery 470 to perform charging.

The transmission 480 may control driving of the rotor-equipped motor 481 under control of the processor 410. The transmission 480 may transform power supplied from the power source 460 into power suitable for driving of the motor 481 that is connected to the rotor to generate propulsion of gas, and supply the transformed power to the motor 481.

The processor 410 may control the overall operation of the electronic device 401, and control operations of other elements (e.g., the communication module 420, the memory 430, the first sensor 441, the second sensor 442, the camera 450, the power source 460, the transmission 480, and the motor 481).

According to various embodiments of the present disclosure, the processor 410 may control movement of the UAV 405 by controlling the motor 481 of the UAV 405. The processor 410 may control sensing operations of the first sensor 441 and the second sensor 442. The processor 410 may determine based on at least one sensing data obtained by the first sensor 441 whether the UAV 405 is located in a first environment. For example, the processor 410 may determine that the UAV 405 is located in the first environment, when sensing an external object in the upward direction of the UAV 405 based on sensing data obtained by the first sensor 441. The first environment may be an indoor environment.

According to various embodiments of the present disclosure, the processor 410 may control the sensing operations of the first sensor 441 and the second sensor 442 according to whether the UAV 405 is located in the first environment (the indoor environment) or a second environment (an outdoor environment). When determining that the UAV 405 is located in the indoor environment, the processor 410 may control a sensing operation of the first sensor 441 that senses the upward direction of the UAV 405 to have a shorter sensing period than that of the second sensor 442 that senses the downward direction of the UAV 405. When determining that the UAV 405 is located in the outdoor environment, the processor 410 may control a sensing operation of the second sensor 442 that senses the downward direction of the UAV 405 to have a shorter sensing period than that of the first sensor 441 that senses the upward direction of the UAV 405.

According to various embodiments of the present disclosure, the processor 410 may select reference data used to control movement of the UAV 405 according to whether the UAV 405 is located in the indoor environment or the outdoor environment. When determining that the UAV 405 is located in the indoor environment, the processor 410 may control movement of the UAV 405 by using as the reference data, the sensing data obtained by the first sensor 441 that senses the upward direction of the UAV 405. When determining that the UAV 405 is located in the outdoor environment, the processor 410 may control movement of the UAV 405 by using as the reference data, the sensing data obtained by the second sensor 441 that senses the downward direction of the UAV 405.

According to various embodiments of the present disclosure, when determining that the UAV 405 is located in the indoor environment, the processor 410 may obtain a height of the indoor environment based on sensing data obtained by the first sensor 441 and the second sensor 442, determine a hovering range of the UAV 405 based on the obtained height of the indoor environment, and control movement of the UAV 405 based on the determined hovering range. The processor 410 may obtain a distance between the UAV 405 and a ceiling of the indoor environment based on sensing data obtained by the first sensor 441, determine a hovering range of the UAV 405 based on the obtained distance to the ceiling, and control movement of the UAV 405 based on the determined hovering range.

According to various embodiments of the present disclosure, the processor 410 may receive a control signal for controlling movement of the UAV 405 from an external electronic device through the communication module 420 and control movement of the UAV 405 according to the received control signal based on at least one sensing data obtained by the first sensor 441 and the second sensor 442. When determining that the UAV 405 is located in the indoor environment, the processor 410 may generate information associated with control of movement of the UAV 405 based on the at least one sensing data obtained by the first sensor 441 and the second sensor 442 and transmit the generated information to the external electronic device. According to various embodiments of the present disclosure, the information associated with control of movement of the UAV 405 may include information regarding whether the UAV 405 is located in the indoor environment, the height of the indoor environment, the distance between the UAV 405 and the ceiling of the indoor environment, information regarding the hovering range of the UAV 405 in the indoor environment, etc. The external electronic device may receive the information associated with control of movement of the UAV 405 and provide a UI based on the information associated with control of movement of the UAV 405. According to various embodiments of the present disclosure, the UI may limit a flight control input to the hovering range in the indoor environment. When determining that the UAV 405 is located in the indoor environment, the processor 410 may control movement of the UAV 405 by limiting the control signal for controlling movement of the UAV 405, received from the external electronic device, to the hovering range in the indoor environment. When the control signal falls beyond the hovering range in the indoor environment, the processor 410 may generate feedback information regarding the control signal and transmit the generated feedback information to the external electronic signal. According to various embodiments of the present disclosure, the feedback information regarding the control signal may include notification information notifying that the control signal for the UAV 405 falls beyond the hovering range in the indoor environment, notification information notifying that the control signal for the UAV 405 falls within the hovering range in the indoor environment and thus movement of the UAV 405 is controlled, or the like. The external electronic device may receive the feedback information regarding the control signal and provide the UI based on the received feedback information.

Figure 4C:
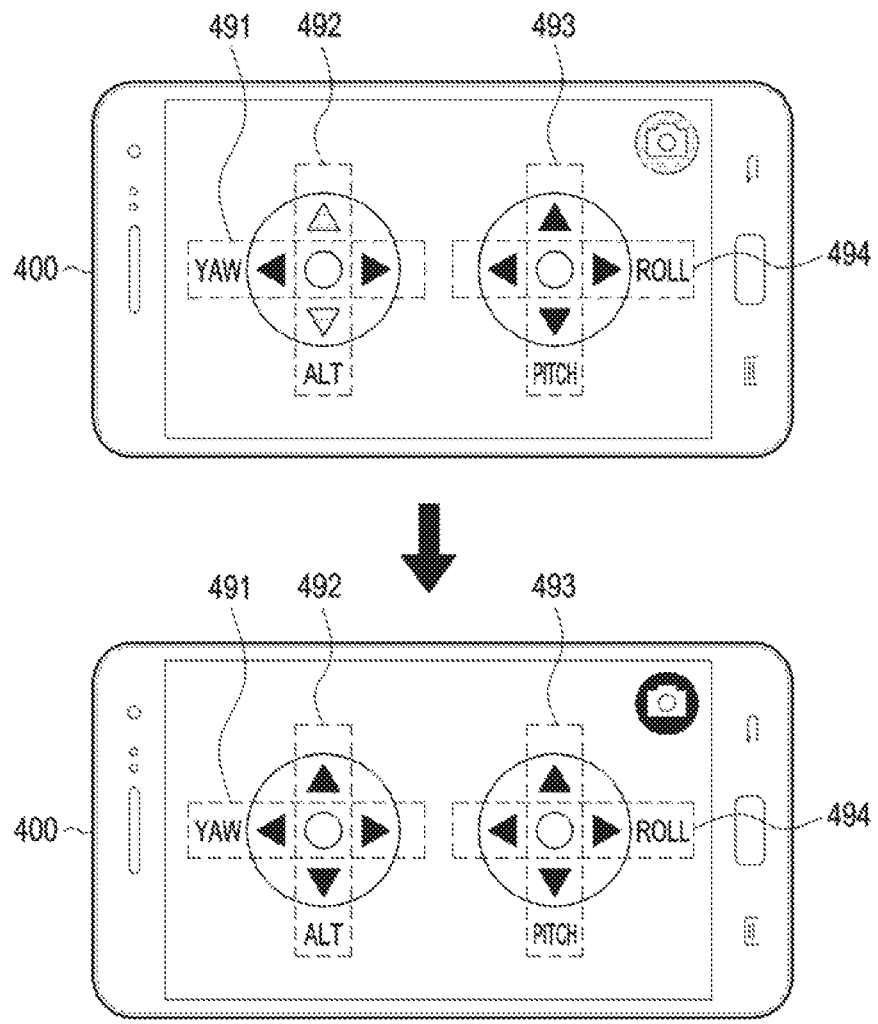
FIG. 4C illustrates an interface used for an electronic device to control movement of an internal structure of an unmanned aerial vehicle (UAV), according to various embodiments of the present disclosure.

FIG. 4C illustrates an interface used for an electronic device to control movement of an internal structure of a UAV, according to various embodiments of the present disclosure.

An external electronic device 400 may be caused by a user to perform a function (e.g., image capturing, selfie capturing, etc.) included in the UAV through a UI. For example, the external electronic device 400 may control yaw, a height, a pitch, and a roll of the UAV, as indicated by 491, 492, 493, and 494. Referring to FIG. 4C, interfaces 491, 492, 493, and 494 of the external electronic device 400 are illustrated, in which the user may identify that a camera icon in an upper right end is deactivated and thus a camera function is deactivated, and that the interface 492 for controlling the height of the UAV in flight in an autonomous mode is deactivated. A hovering range of the UAV may be set based on the height of the indoor environment, and movement of the UAV may be controlled based on the hovering range. Once the camera function is activated as in a lower portion of FIG. 4C, the UAV may perform image capturing and selfie capturing as well as flight, and when the capturing is performed in the indoor environment, the user needs to control the height of the UAV to prevent the UAV from colliding with the ceiling or to perform accurate capturing. Thus, the electronic device 400 may activate the interface 492 for controlling the height of the UAV even when the UAV moves in the autonomous mode in the indoor environment, such that the user may directly control the height of the UAV through the interface 492 of the electronic device 400. In a case where the height of the UAV changes, the hovering range of the UAV may also change with the height and in this case, the UAV may provide various feedback such as a vibration feedback, a sound feedback, deactivation of the interface 492, etc., to the electronic device 400 such that the UAV may be controlled within the hovering range.

According to various embodiments of the present disclosure, the UI may provide feedback information through screen display, a vibration feedback, a sound feedback, etc. The screen display may be made in various ways, such as using an image, an icon, a text, a color, etc., as described above with reference to FIG. 4C.

According to various embodiments of the present disclosure, the processor 410 may receive a command signal for executing a function (e.g., image capturing, selfie capturing, etc.) included in the UAV 405 from the external electronic device through the communication module 420. The processor 410 may execute an operation of an element (e.g., the camera module 450) included in the UAV 405 according to the command signal received from the external electronic device. The processor 410 may control movement of the UAV 405 according to the command signal received from the external electronic device.

According to various embodiments of the present disclosure, in the case that the first sensor 441 and the second sensor 442 include a plurality of sensors having different distance sensing ranges, the processor 410 may detect a distance between the UAV 405 and an external object based on sensing data obtained by the first sensor 441 and the second sensor 442 and select and control the plurality of sensors based on the detected distance. For example, the processor 410 may select a sensor type depending on a condition such that the processor 410 may select an ultrasonic sensor for a long distance to the external object and a proximity sensor for a short distance to the external object.

Figure 5:
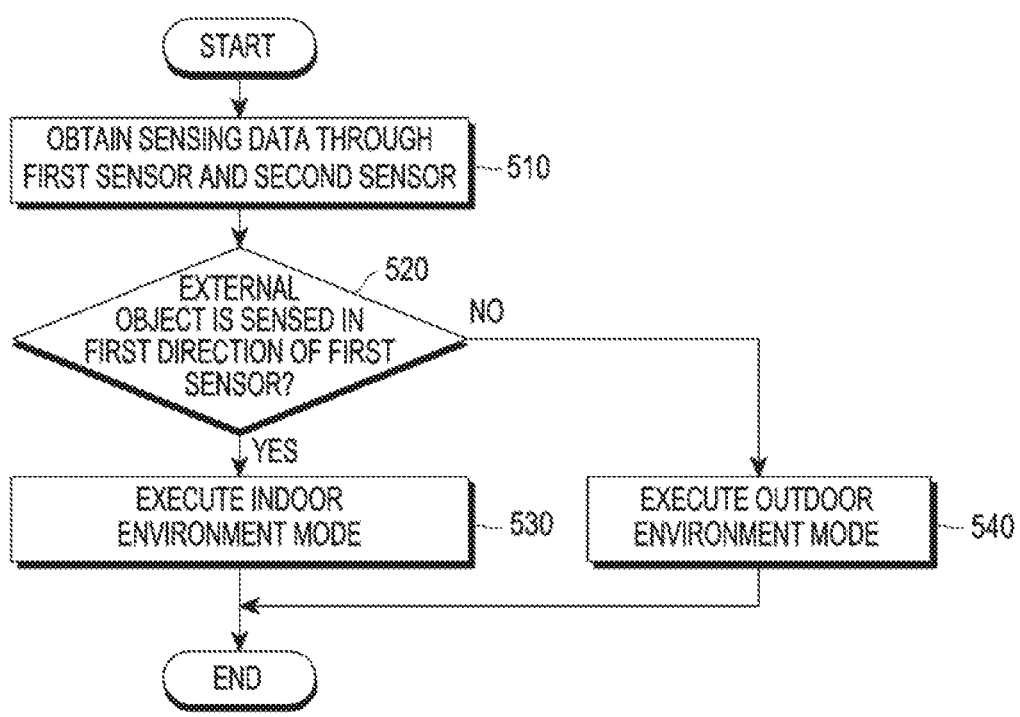
FIG. 5 is a flowchart illustrating a method in which an electronic device controls movement of a UAV, according to various embodiments of the present disclosure.

FIG. 5 is a flowchart illustrating a method in which an electronic device controls movement of a UAV, according to various embodiments of the present disclosure.

Referring to FIG. 5, when the UAV starts flight, the electronic device may initiate sensing operations of the first sensor and the second sensor and obtain sensing data through the first sensor and the second sensor in operation 510.

In operation 520, the electronic device may determine based on the sensing data obtained by the first sensor whether an external object is detected in a first direction of the first sensor, i.e., in the upward direction of the UAV.

In operation 530, when determining that the external object is detected in the first direction of the first sensor, the electronic device may identify that the UAV is located in an indoor environment, and execute an indoor environment mode as a flight mode of the UAV.

In operation 540, when determining that the external object is not detected in the first direction of the first sensor, the electronic device may identify that the UAV is located in an outdoor environment, and execute an outdoor environment mode as the flight mode of the UAV.

Figure 6:
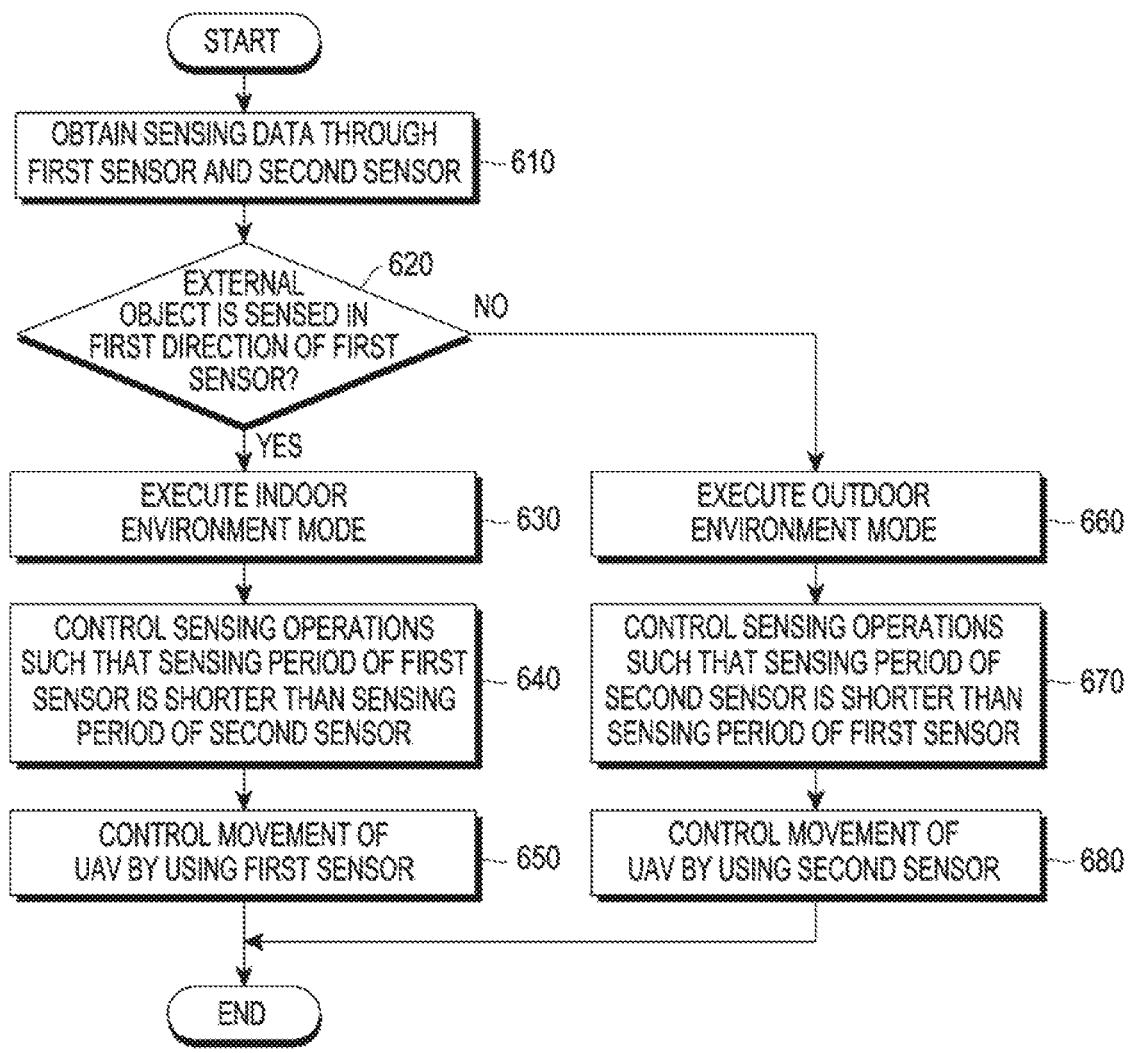
FIG. 6 is a flowchart illustrating a method in which an electronic device controls movement of a UAV, according to various embodiments of the present disclosure.

FIG. 6 is a flowchart illustrating a method in which an electronic device controls movement of a UAV, according to various embodiments of the present disclosure.

Referring to FIG. 6, when the UAV starts flight, the electronic device may initiate sensing operations of the first sensor and the second sensor and obtain sensing data through the first sensor and the second sensor in operation 610.

In operation 620, the electronic device may determine based on the sensing data obtained by the first sensor whether an external object is detected in a first direction of the first sensor, i.e., in the upward direction of the UAV.

In operation 630, when determining that the external object is detected in the first direction of the first sensor, the electronic device may identify that the UAV is located in an indoor environment, and execute an indoor environment mode as a flight mode of the UAV.

In operation 640, the electronic device may control the sensing operations of the first sensor and the second sensor such that a sensing period of the first sensor is shorter than that of the second sensor.

In operation 650, the electronic device may configure the sensing data obtained by the first sensor as reference data and control movement of the UAV by using the sensing data obtained by the first sensor.

In operation 660, when determining that the external object is not detected in the first direction of the first sensor, the electronic device may identify that the UAV is located in an outdoor environment, and execute an outdoor environment mode as the flight mode of the UAV.

In operation 670, the electronic device may control the sensing operations of the first sensor and the second sensor such that the sensing period of the second sensor is shorter than that of the first sensor.

In operation 680, the electronic device may configure the sensing data obtained by the second sensor as reference data and control movement of the UAV by using the sensing data obtained by the second sensor.

Figure 7:
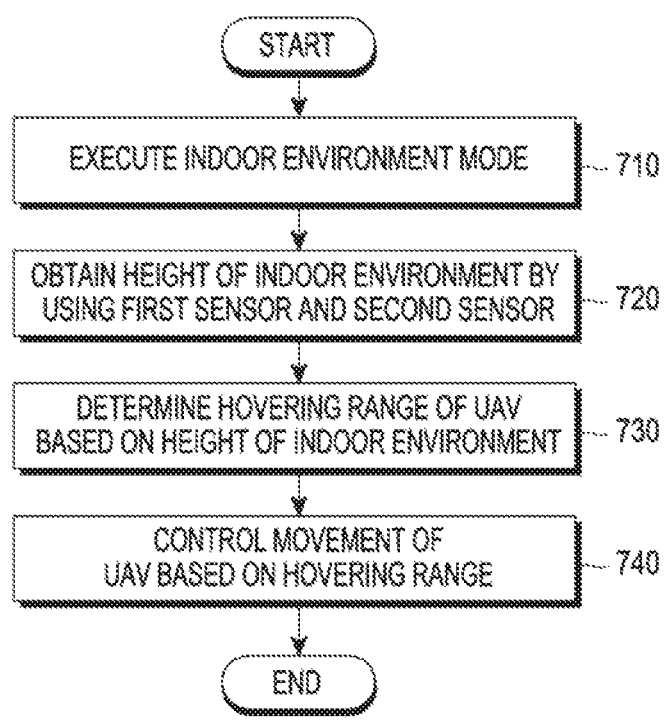
FIG. 7 is a flowchart illustrating a method in which an electronic device controls movement of a UAV in an indoor environment, according to various embodiments of the present disclosure.

FIG. 7 is a flowchart illustrating a method in which an electronic device controls movement of a UAV in an indoor environment, according to various embodiments of the present disclosure.

Referring to FIG. 7, when determining that the UAV flies in the indoor environment, the electronic device may execute the indoor environment mode as the flight mode of the UAV in operation 710.

In operation 720, the electronic device may obtain the height of the indoor environment based on the sensing data obtained by the first sensor and the second sensor. According to various embodiments of the present disclosure, the electronic device may obtain a distance between the UAV and the ceiling of the indoor environment based on the sensing data obtained by the first sensor.

In operation 730, the electronic device may determine the hovering range of the UAV based on the height of the indoor environment. According to various embodiments of the present disclosure, the electronic device may determine the hovering range of the UAV based on the distance between the UAV and the ceiling of the indoor environment.

In operation 740, the electronic device may control movement of the UAV based on the hovering range of the UAV. The electronic device may also provide to the user through screen display, sound, vibration, etc., a feedback indicating that movement of the UAV may be controlled based on the hovering range.

Figure 8:
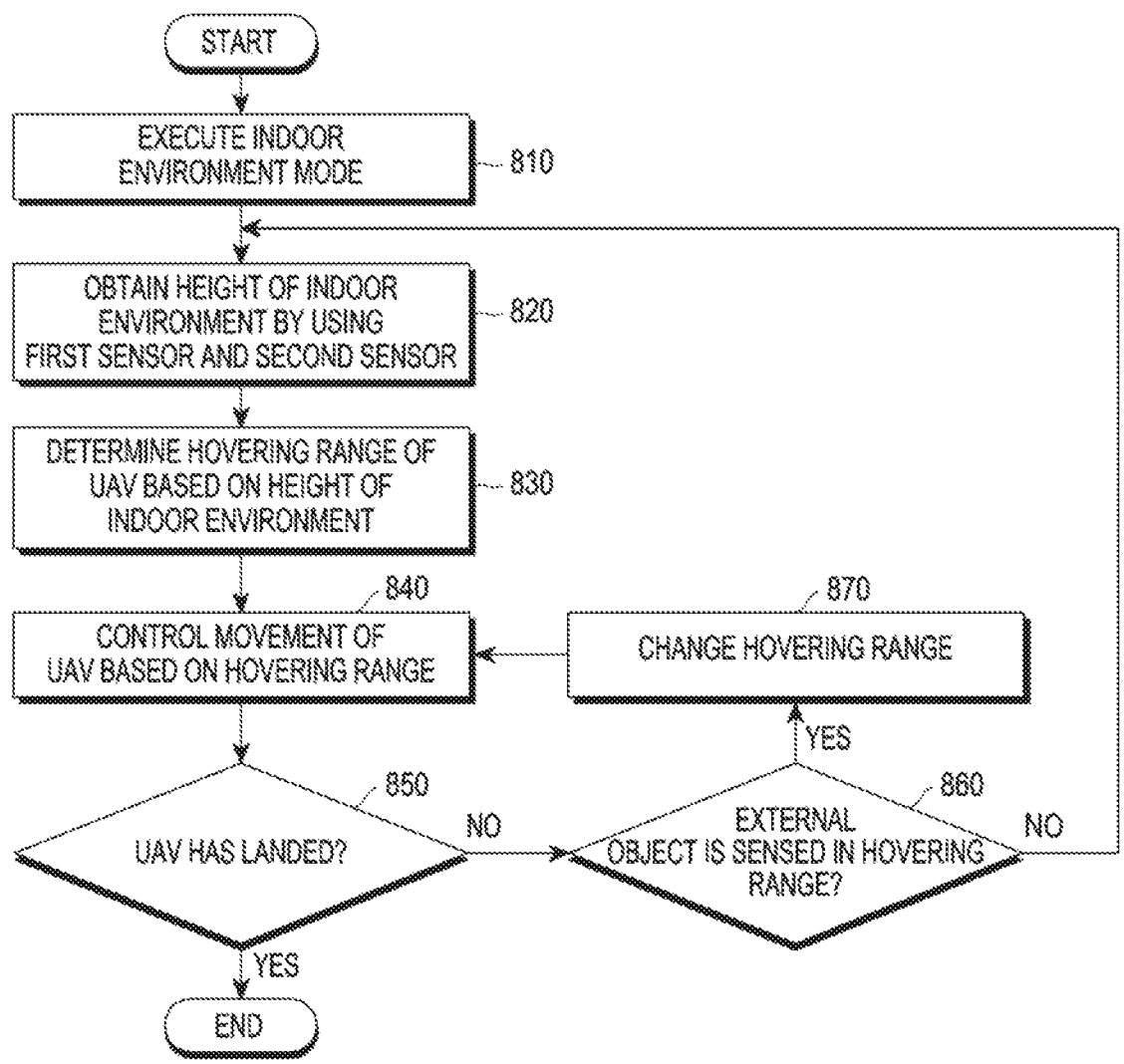
FIG. 8 is a flowchart illustrating a method in which an electronic device controls movement of a UAV in an indoor environment, according to various embodiments of the present disclosure.

FIG. 8 is a flowchart illustrating a method in which an electronic device controls movement of a UAV in an indoor environment, according to various embodiments of the present disclosure.

Referring to FIG. 8, when determining that the UAV flies in the indoor environment, the electronic device may execute the indoor environment mode as the flight mode of the UAV in operation 810.

In operation 820, the electronic device may obtain the height of the indoor environment based on the sensing data obtained by the first sensor and the second sensor. According to various embodiments of the present disclosure, the electronic device may obtain a distance between the UAV and the ceiling of the indoor environment based on the sensing data obtained by the first sensor.

In operation 830, the electronic device may determine the hovering range of the UAV based on the height of the indoor environment. According to various embodiments of the present disclosure, the electronic device may determine the hovering range of the UAV based on the distance between the UAV and the ceiling of the indoor environment.

In operation 840, the electronic device may control movement of the UAV based on the hovering range of the UAV.

In operation 850, the electronic device may determine whether the UAV has landed. When the UAV is in proximity to the floor of the indoor environment, the electronic device may reduce the speed of the UAV, and when the distance between the UAV and the floor is '0', the electronic device may stop the rotor of the UAV to control the UAV to land. Upon receiving a control signal commanding landing of the UAV from the external electronic device, the electronic device may control the UAV to approach the floor of the indoor environment, such that when the distance between the UAV and the floor is '0', the electronic device may stop the rotor of the UAV to control the UAV to land. When detecting that the user holds the UAV, the electronic device may stop the rotor of the UAV to control the UAV to land.

In operation 860, the electronic device may determine whether an external object is detected in the hovering range of the UAV during flight of the UAV. The electronic device may repeat the above-described operation when determining that the external object is not detected in the hovering range in the indoor environment.

When determining that the external object is detected in the hovering range of the UAV, the electronic device may change the hovering range based on a distance between the detected external object and the UAV in operation 870, and control movement of the UAV based on the changed hovering range in operation 840.

Figure 9:
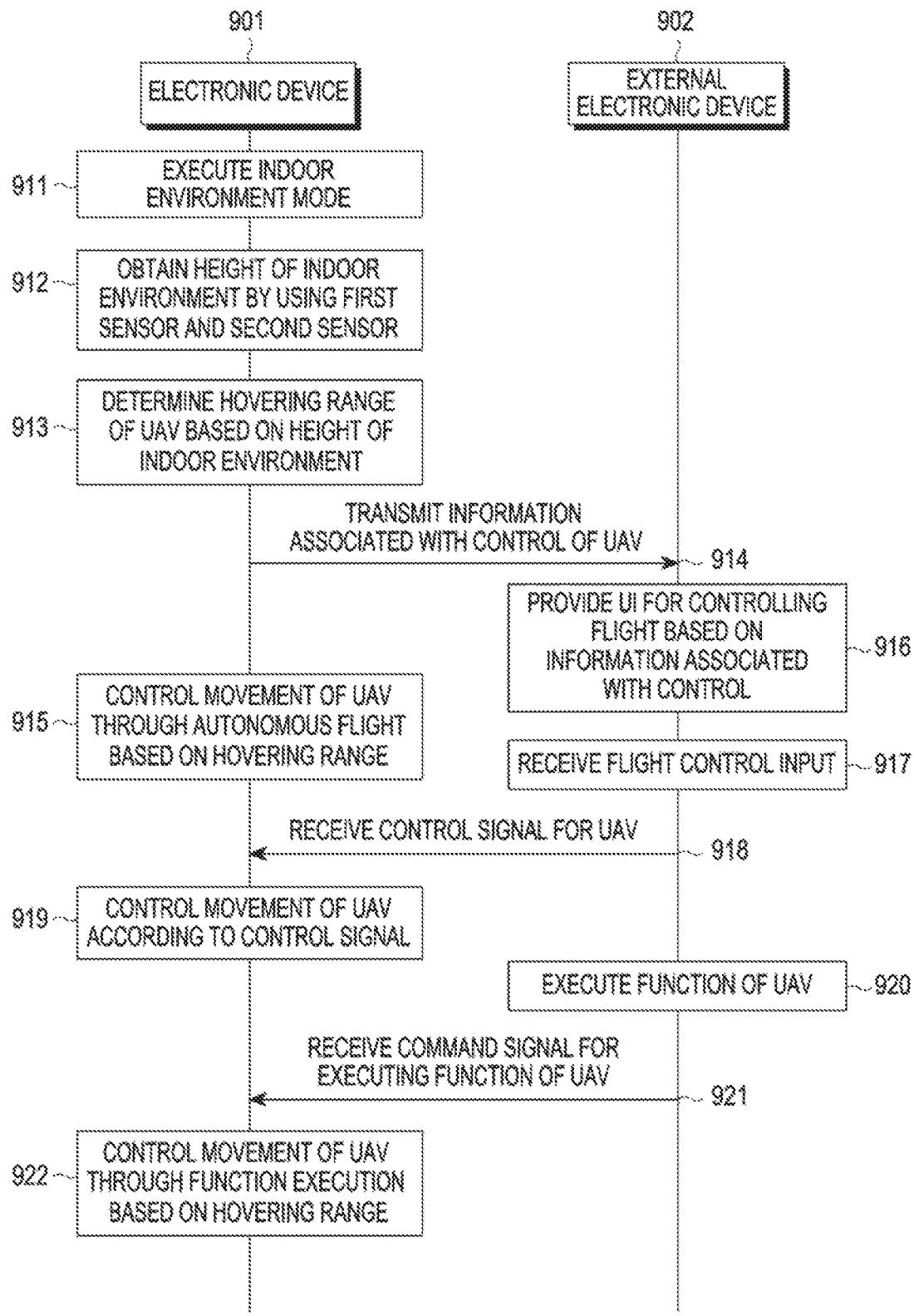
FIG. 9 is a flowchart illustrating a method in which an electronic device and an external electronic device control movement of a UAV in an indoor environment, according to various embodiments of the present disclosure.

FIG. 9 is a flowchart illustrating a method in which an electronic device and an external electronic device control movement of a UAV in an indoor environment, according to various embodiments of the present disclosure.

Referring to FIG. 9, in operation 911, when an electronic device 901 (e.g., a UAV) determines that the UAV flies in the indoor environment, the electronic device 901 may execute the indoor environment mode as the flight mode of the UAV.

In operation 912, the electronic device 901 may obtain the height of the indoor environment based on the sensing data obtained by the first sensor and the second sensor. According to various embodiments of the present disclosure, the electronic device 901 may obtain the distance between the UAV and the ceiling of the indoor environment based on the sensing data obtained by the first sensor.

In operation 913, the electronic device 901 may determine the hovering range of the UAV based on the height of the indoor environment. According to various embodiments of the present disclosure, the electronic device may determine the hovering range of the UAV based on the distance between the UAV and the ceiling of the indoor environment.

In operation 914, the electronic device 901 may generate the information associated with control of movement of the UAV based on the at least one sensing data obtained by the first sensor and the second sensor and transmit the generated information to an external electronic device 902 (e.g., a mobile terminal). According to various embodiments of the present disclosure, the information associated with control of movement of the UAV may include information regarding whether the UAV is located in the indoor environment, the height of the indoor environment, the distance between the UAV and the ceiling of the indoor environment, information regarding the hovering range of the UAV in the indoor environment, etc.

In operation 915, the electronic device 901 may control movement of the UAV based on the hovering range of the UAV.

In operation 916, the external electronic device 902 may provide a UI based on the information associated with control of movement of the UAV, received from the electronic device 901. According to various embodiments of the present disclosure, the UI may limit a flight control input to the hovering range in the indoor environment.

In operation 917, the external electronic device 902 may receive the flight control input for controlling movement of the UAV from the user through the UI. The flight control input may be an input such that the UAV may move within the hovering range in the indoor environment. The external electronic device 902 may generate a control signal for controlling movement of the UAV based on the flight control input, and transmit the generated control signal to the electronic device 901.

In operation 918, the electronic device 901 may receive the control signal for controlling movement of the UAV from the external electronic device 902.

In operation 919, the electronic device 901 may control movement of the UAV according to the control signal received from the external electronic device 902.

In operation 920, the external electronic device 902 may receive an input for request execution of a function (e.g., image capturing, selfie capturing, etc.) included in the UAV from the user through the UI, and execute the function of the UAV. The external electronic device 902 may change the UI according to execution of the function of the UAV. The external electronic device 902 may generate a command signal for the function of the UAV and transmit the generated command signal to the electronic device 901.

In operation 921, the electronic device 901 may receive the command signal for executing the function of the UAV from the external electronic device 902.

In operation 922, the electronic device 901 may execute an operation of an element (e.g., the camera module) included in the UAV according to the command signal received from the external electronic device 902. The electronic device 901 may control movement of the UAV through function execution based on the hovering range.

Figure 10:
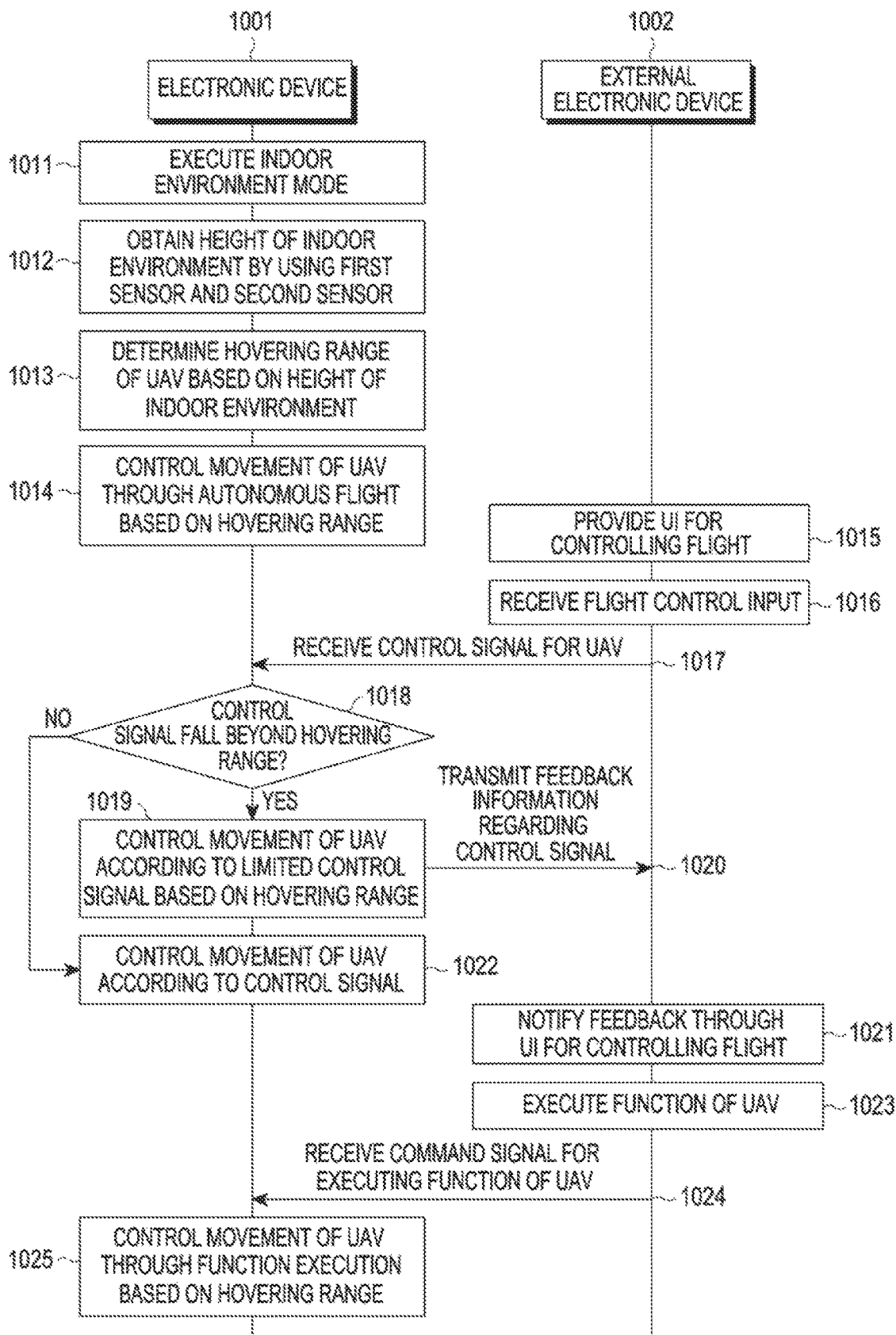
FIG. 10 is a flowchart illustrating a method in which an electronic device and an external electronic device control movement of a UAV in an indoor environment, according to various embodiments of the present disclosure.

FIG. 10 is a flowchart illustrating a method in which an electronic device and an external electronic device control movement of a UAV in an indoor environment, according to various embodiments of the present disclosure.

Referring to FIG. 10, in operation 1011, when an electronic device 1001 (e.g., a UAV) determines that the UAV flies in the indoor environment, the electronic device 1001 may execute the indoor environment mode as the flight mode of the UAV.

In operation 1012, the electronic device 1001 may obtain the height of the indoor environment based on the sensing data obtained by the first sensor and the second sensor. According to various embodiments of the present disclosure, the electronic device 901 may obtain the distance between the UAV and the ceiling of the indoor environment based on the sensing data obtained by the first sensor.

In operation 1013, the electronic device 1001 may determine the hovering range of the UAV based on the height of the indoor environment. According to various embodiments of the present disclosure, the electronic device may determine the hovering range of the UAV based on the distance between the UAV and the ceiling of the indoor environment.

In operation 1014, the electronic device 1001 may control movement of the UAV based on the hovering range of the UAV.

In operation 1015, the external electronic device 1002 may provide a UI for controlling movement of the UAV.

In operation 1016, the external electronic device 1002 may receive the flight control input for controlling movement of the UAV from the user through the UI. The external electronic device 902 may generate a control signal for controlling movement of the UAV based on the flight control input, and transmit the generated control signal to the electronic device 901.

In operation 1017, the electronic device 1001 may receive the control signal for controlling movement of the UAV from the external electronic device 1002.

In operation 1018, the electronic device 1001 may determine whether the control signal received from the external electronic device 1002 falls beyond the hovering range in the indoor environment.

In operation 1019, the electronic device 1001 may control movement of the UAV by limiting the control signal received from the external electronic device 1002 to the hovering range in the indoor environment.

In operation 1020, the electronic device 1001 may generate feedback information regarding the control signal and transmit the generated feedback information to the external electronic device 1002. According to various embodiments of the present disclosure, the feedback information regarding the control signal may include notification information notifying that the control signal for the UAV falls beyond the hovering range in the indoor environment, notification information notifying that the control signal for the UAV falls within the hovering range in the indoor environment and thus movement of the UAV is controlled, or the like.

In operation 1021, the external electronic device 1002 may receive the feedback information regarding the control signal and provide the UI based on the received feedback information. According to various embodiments of the present disclosure, the UI may provide feedback information through screen display, a vibration feedback, a sound feedback, etc.

In operation 1022, when determining that the control signal received from the external electronic device 1002 falls within the hovering range of the indoor environment, the electronic device 1001 may control movement of the UAV according to the control signal received from the external electronic device 1002.

In operation 1023, the external electronic device 1002 may receive an input for request execution of a function (e.g., image capturing, selfie capturing, etc.) included in the UAV from the user through the UI, and execute the function of the UAV. The external electronic device 1002 may change the UI according to execution of the function of the UAV. For example, as illustrated in FIG. 4C, when a camera application is executed by the user to perform image capturing or selfie capturing, the electronic device 1001 may receive a user's input from the user interface 492 to adjust the height of the UAV, and may reset the hovering range based on the adjusted height to perform capturing.

The external electronic device 1002 may generate a command signal for the function of the UAV and transmit the generated command signal to the electronic device 1001.

In operation 1024, the electronic device 1001 may receive the command signal for executing the function of the UAV from the external electronic device 1002.

In operation 1025, the electronic device 1001 may execute an operation of an element (e.g., the camera module) included in the UAV according to the command signal received from the external electronic device 1002. The electronic device 1001 may control movement of the UAV through function execution based on the hovering range.

The embodiments disclosed in the present specification and drawings have been provided to easily describe the present disclosure and to help understanding of the present disclosure, and are not intended to limit the scope of the present disclosure. Therefore, it should be construed that the scope of the present disclosure includes any change or other various embodiments based on the technical spirit of the present disclosure as well as the embodiments described herein.

What is claimed is:

1. An electronic device for controlling an unmanned aerial vehicle (UAV), the electronic device comprising:
a first sensor configured to sense a first direction;
a second sensor configured to sense a second direction that is opposite to the first direction; and
a processor electrically connected to the first sensor and the second sensor,
wherein the processor is configured to:
determine based on at least one sensing data obtained by the first sensor whether the UAV is located in a first environment,
control sensing operations of the first sensor and the second sensor based on a result of the determination, and
control movement of the UAV based on at least one sensing data obtained by the first sensor and the second sensor,
wherein the first sensor and the second sensor comprise a plurality of sensors having different distance sensing ranges,
wherein the processor is further configured to:
based on a distance between the UAV and an external object being longer than or equal to a first distance, select a third sensor among the plurality of sensors, and
based on the distance being shorter than the first distance, select a fourth sensor among the plurality of sensors.

2. The electronic device of claim 1, wherein the first sensor and the second sensor comprise at least one of an ultrasonic sensor, an infrared sensor, a proximity sensor, an image sensor, or an optical flow sensor.

3. The electronic device of claim 1, wherein the processor is configured to determine that the UAV is located in the first environment when the external object is detected in the first direction based on the at least one sensing data obtained by the first sensor.

4. The electronic device of claim 1, wherein the processor is configured to control the sensing operations such that a sensing period of the first sensor is shorter than a sensing period of the second sensor, when determining that the UAV is located in the first environment.

5. The electronic device of claim 1, wherein the processor is configured to control movement of the UAV by using the at least one sensing data obtained by the first sensor as reference data, when determining that the UAV is located in the first environment.

6. The electronic device of claim 1, wherein the processor is configured to, when determining that the UAV is located in the first environment, obtain a height of the first environment based on the at least one sensing data obtained by the first sensor and the second sensor, determine a hovering range of the UAV based on the obtained height of the first environment, and control movement of the UAV based on the determined hovering range.

7. The electronic device of claim 1, further comprising a communication module configured to connect communication with an external electronic device,
wherein the processor is configured to:
receive a control signal for controlling movement of the UAV from the external electronic device; and
control movement of the UAV according to the received control signal based on the at least one sensing data obtained by the first sensor and the second sensor.

8. The electronic device of claim 7, wherein the processor is configured to transmit, to the external electronic device, information associated with control of movement of the UAV based on the at least one sensing data obtained by the first sensor and the second sensor.

9. The electronic device of claim 7, wherein the processor is configured to transmit, to the external electronic device, feedback information regarding the control signal received from the external electronic device based on the at least one sensing data obtained by the first sensor and the second sensor.

10. The electronic device of claim 7, wherein the processor is configured to:
receive a command signal for executing a function included in the UAV from the external electronic device; and
control execution of the function of the UAV and movement of the UAV according to the received command signal based on the at least one sensing data obtained by the first sensor and the second sensor.

11. An electronic device for controlling movement of an unmanned aerial vehicle (UAV), the electronic device comprising:
a communication module configured to connect communication with the UAV;
a display configured to display a user interface for controlling the UAV, the UAV comprising a first sensor configured to sense a first direction and a second sensor configured to sense a second direction opposite to the first direction; and
a processor electrically connected to the communication module and the display,
wherein the processor is configured to:
receive from the UAV, information regarding whether the UAV is located in a first environment at least based on at least one sensing data obtained by the first sensor,
based on the UAV being located in the first environment, display the user interface in which an object for controlling a height of the UAV is deactivated while the UAV is in flight in an autonomous mode,
generate a control signal for controlling movement of the UAV based on an input made through the user interface, and
transmit the generated control signal to the UAV,
wherein the processor is further configured to:
based on identifying that a camera application is executed, activate the object for controlling the height of the UAV, while the UAV is located in the first environment and the UAV is in flight in the autonomous mode.

12. The electronic device of claim 11, wherein the processor is further configured to
receive from the UAV, information associated with control of movement of the UAV based on the at least one sensing data obtained by the first sensor and the second sensor, and
change the user interface based on the received information associated with control of movement of the UAV.

13. The electronic device of claim 11, wherein the processor is further configured to:

receive from the UAV, feedback information regarding the control signal based on the at least one sensing data obtained by the first sensor and the second sensor, and change the user interface based on the received feedback information.

14. A control method of an electronic device for controlling an unmanned aerial vehicle (UAV), the control method comprising:

obtaining sensing data through a first sensor configured to sense a first direction;

obtaining sensing data through a second sensor configured to sense a second direction that is opposite to the first direction;

determining whether the UAV is located in a first environment, based on at least one sensing data obtained by the first sensor;

controlling sensing operations of the first sensor and the second sensor, based on a result of the determination; and controlling movement of the UAV, based on at least one sensing data obtained by the first sensor and the second sensor, wherein the first sensor and the second sensor comprise a plurality of sensors having different distance sensing ranges, wherein the control method further comprises:

based on a distance between the UAV and an external object being longer than or equal to a first distance, selecting a third sensor among the plurality of sensors; and based on the distance being shorter than the first distance, selecting a fourth sensor among the plurality of sensors.

* * * * *